United States Patent [19]

Yoshida et al.

[11] Patent Number: 5,587,094
[45] Date of Patent: Dec. 24, 1996

[54] LASER MARKING APPARATUS

[75] Inventors: Koji Yoshida, Hiratsuka, Japan; Taku Yamazaki, Pittsburgh, Pa.; Akira Mori, Chigasaki, Japan

[73] Assignee: Kabushiki Kaisha Komatsu Seisakusho, Tokyo, Japan

[21] Appl. No.: 433,416

[22] PCT Filed: Nov. 24, 1993

[86] PCT No.: PCT/JP93/01717

§ 371 Date: May 23, 1995

§ 102(e) Date: May 23, 1995

[87] PCT Pub. No.: WO94/12309

PCT Pub. Date: Jun. 9, 1994

[30] Foreign Application Priority Data

Nov. 25, 1992 [JP] Japan .................. 4-086578 U

[51] Int. Cl.⁶ .................................. B23K 26/06
[52] U.S. Cl. ............... 219/121.68; 219/121.73; 219/121.77; 347/256
[58] Field of Search .............. 219/121.68, 121.69, 219/121.73, 121.74, 121.75, 121.6, 121.85, 121.76, 121.77; 347/256–261; 359/496, 497, 500

[56] References Cited

U.S. PATENT DOCUMENTS 4,367,009  1/1983  Suzki ........................ 359/204
5,309,273  5/1994  Mori et al. ................. 219/121.68

FOREIGN PATENT DOCUMENTS

| 207347 | 2/1984 | German Dem. Rep. | ......... 219/121.77 |
| 53-68499 | 6/1978 | Japan | .................. 219/121.73 |
| 3-18491 | 1/1991 | Japan | .................. 219/121.75 |
| 4-61141 | 2/1992 | Japan . | |
| 4-94881 | 3/1992 | Japan . | |
| 4-251683 | 9/1992 | Japan | .................. 219/121.68 |

*Primary Examiner*—Teresa J. Walberg
*Assistant Examiner*—Gregory L. Mills
*Attorney, Agent, or Firm*—Sidley & Austin

[57] ABSTRACT

A laser marking apparatus, capable of marking at a high scanning speed, effectively utilizing a laser power, and providing high marking accuracy, irradiates an incident laser beam from a laser beam source onto a marking surface by raster-scanning through a raster scanning system. The raster scanning system includes an X-direction polarizing mirror, a Y-direction polarizing mirror, a field lens, and a mask. A double polarizing prism, which includes a pair of polarizing prisms (13a, 13b) for branching the incident laser beam (1) into twin laser beams, is arranged in series at an intermediate position between the laser beam source (2) and the upstream one of the X-direction polarizing mirror (3) and the Y-direction polarizing mirror (8). An adjusting means is provided to vary the distance between the two polarizing prisms (13a, 13b) or to rotate one or both of the polarizing prisms (13a, 13b) to vary the rotation angle by rotating one of the twin laser beams around the other, to thereby vary the distance between the centers of the twin laser beams as they irradiate the mask.

25 Claims, 4 Drawing Sheets

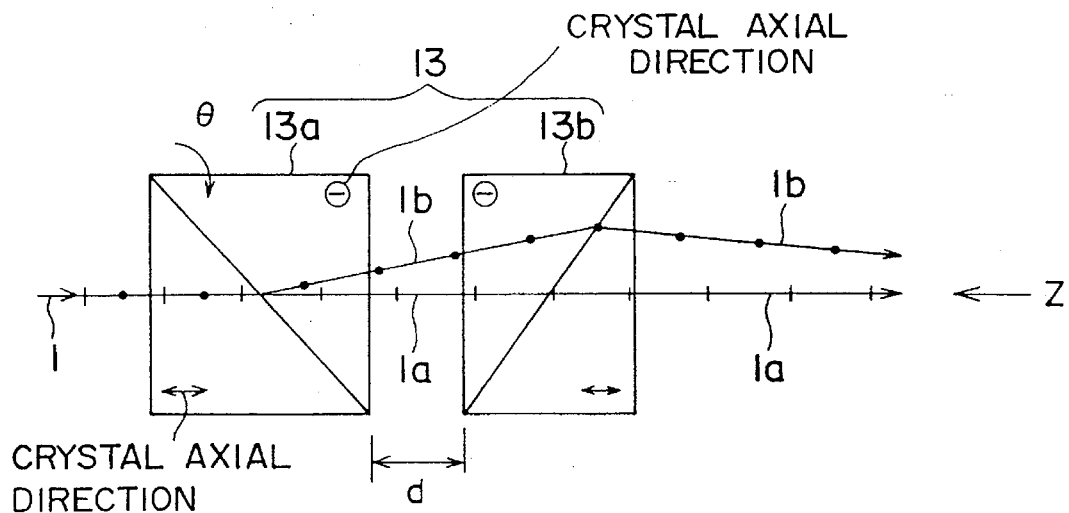
FIG.2A
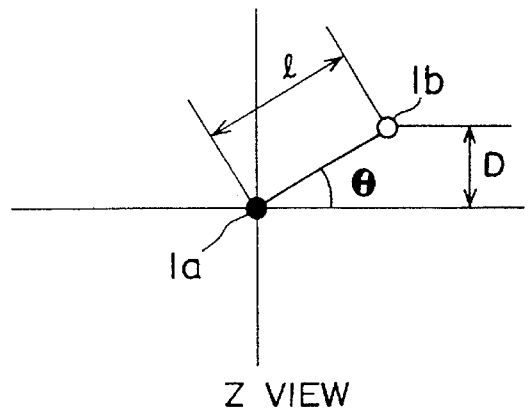
FIG.2B
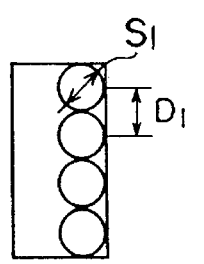 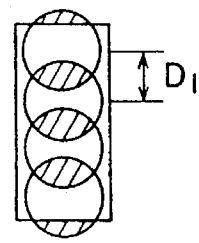 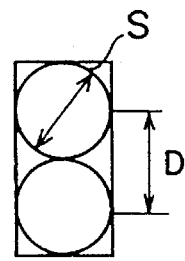
FIG.2C   FIG.2D   FIG.2E

LASER MARKING APPARATUS

FIELD OF THE INVENTION

The present invention relates to a raster-scanning type laser marking apparatus and, more particularly, a laser marking apparatus which branches a laser beam for scanning.

BACKGROUND RELATED ART

A conventional raster-scanning type laser marking apparatus is adapted to scan a mask with a laser beam having a high peak power and to mark on a marking surface the shape of a part of the mask through which the laser beam is transmitted. However, since the laser beam is reduced so as to be narrow, its unit irradiation area is small.

Such laser marking apparatus, which provides a unit irradiation light having a high energy level, is effective for marking on a material having a relatively high marking threshold such as, for example, a metal. However, marking on a material having a low marking threshold such as, for example, a synthetic resin, is carried out on the same irradiation area by reducing this energy level. Therefore, despite a material having a low marking threshold, it requires the same marking time as a material having a high marking threshold, and the resultant efficiency is low.

For marking on the material having a low marking threshold, the energy can be maintained at the same level by increasing the irradiation area. However, if the area of the irradiated surface is expanded in an optical system of the conventional laser marking apparatus, a problem occurs in that satisfactory marking cannot be carried out because there are substantial differences in the distribution of the energy density between the central part of the irradiation area and the periphery thereof.

SUMMARY OF THE INVENTION

An object of the present invention is to provide a laser marking apparatus having a high marking accuracy, which effectively uses the power of the laser, and which is capable of substantially doubling the irradiation area on a surface to be irradiated by the laser beam while maintaining the same intensity distribution of the laser beam from the central part to the periphery, and of marking on a material having a low marking threshold at a scanning speed which is two or more times greater than that of the conventional high output laser marking apparatus providing enough laser power for marking on a material having a high marking threshold.

According to a first aspect of the present invention, a laser marking apparatus, which irradiates an incident laser beam from a laser beam source, for raster-scanning a surface to be marked, through a raster-scanning system comprising an X-direction polarizing mirror, a Y-direction polarizing mirror, a field lens, a mask, etc., is provided with a double polarizing prism comprising a pair of polarizing prisms, for branching the incident laser beam into twin laser beams, arranged in series at intermediate positions between the laser beam source and the upstream one of the X-direction polarizing mirror and the Y-direction polarizing mirror, and adjusting means for varying a distance between the two polarizing prisms. This adjusting means comprises a rotary holder supporting one of the polarizing prisms and having a geared surface on its outer periphery, a slide holder which engages with the rotary holder and accommodates the other polarizing prism, and motors for driving these holders to rotate the rotary holder and to move the slide holder in the direction of the incident laser beam.

A second aspect of the present invention is provided with an adjusting means for a rotation angle at which the two polarizing prisms can be simultaneously rotated. This rotation angle adjusting means comprises a rotary holder which is provided with a pulley on its outer periphery and accommodates the pair of polarizing prisms, a bearing which holds the rotary holder so as to be rotatable, and a motor for driving the pulley to adjust the rotation angle by rotating the rotary holder. In this case, the pair of polarizing prisms can be adapted so that one of these polarizing prisms is independently rotated.

According to a first configuration, the distance between the twin laser beams on the mask surface can be changed. Also, according to a second configuration, one of the twin laser beams can be rotated around the other laser beam on the mask surface so that the distance between the twin laser beams can be changed accordingly. Consequently, although the diameter of the laser beam is increased when the laser power is raised, the distance between the twin laser beams can be adjusted so that the beam spots do not overlap one another during scanning. Thus the laser power can be effectively used and, even though the laser beam diameter is increased, the number of scanning lines and the scanning time can be reduced.

Figure 3:
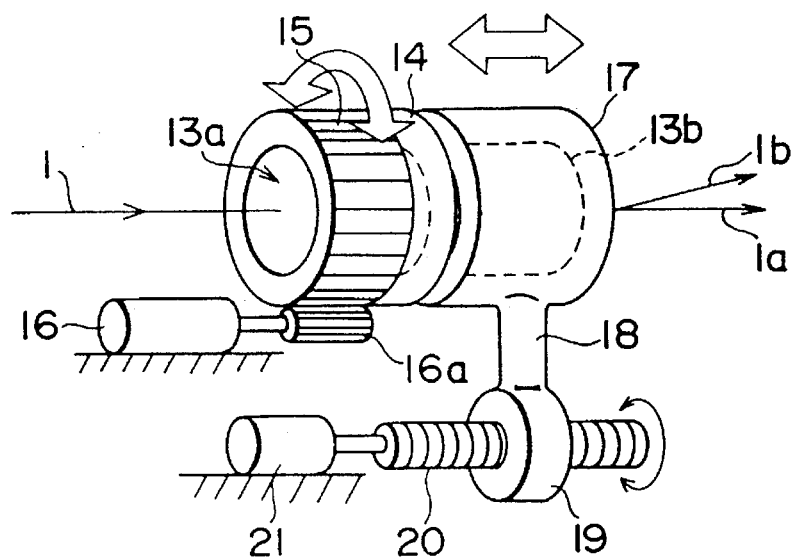
Figure 4:
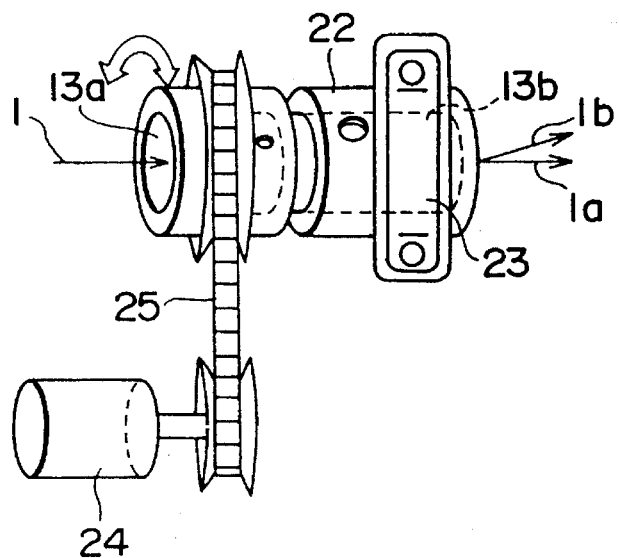
Figure 5A:
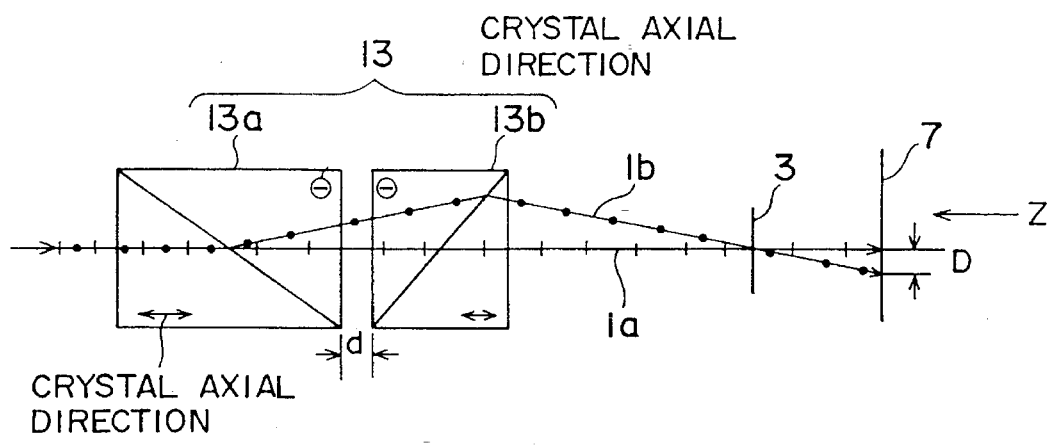
Figure 5B:
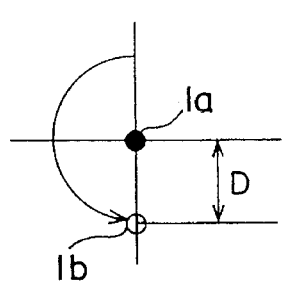
Figure 5C:
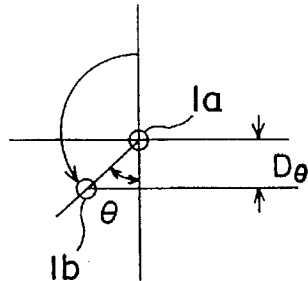
Figure 6:
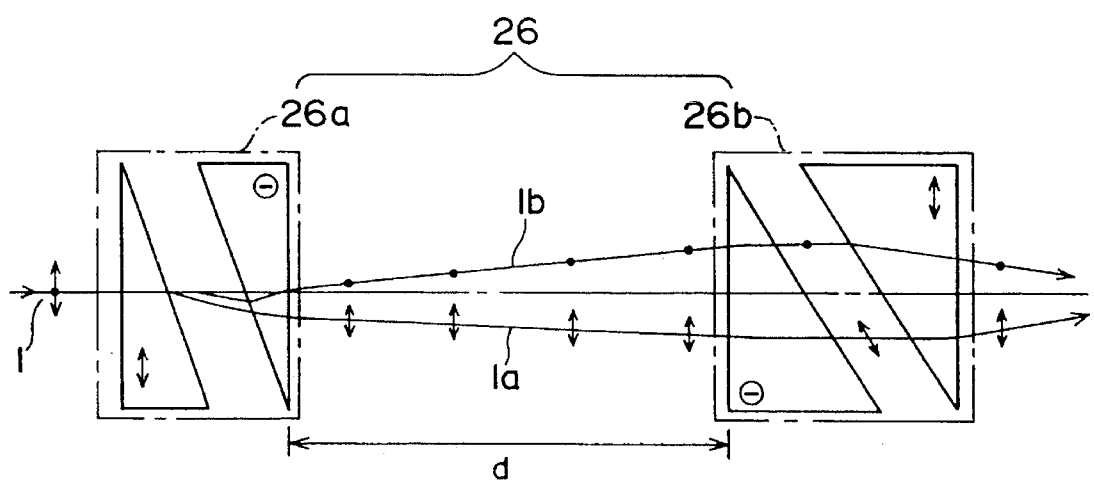

Each of FIGS. 2A to 2E is a diagram illustrating the operation of a double polarizing prism which branches a laser beam into twin laser beams;

FIG. 3 is a perspective view of an adjusting device according to the first embodiment of the double polarizing prism;

FIG. 4 is a perspective view of an adjusting device according to a second embodiment of the double polarizing prism;

Each of FIGS. 5A to 5C is a diagram illustrating the operation of the double polarizing prism in the adjusting device shown in FIG. 4; and FIG. 6 is a diagram illustrating an operation where a pair of Wollaston prisms is used as the double polarizing prism.

BEST MODE FOR CARRYING OUT THE INVENTION

Figure 1:
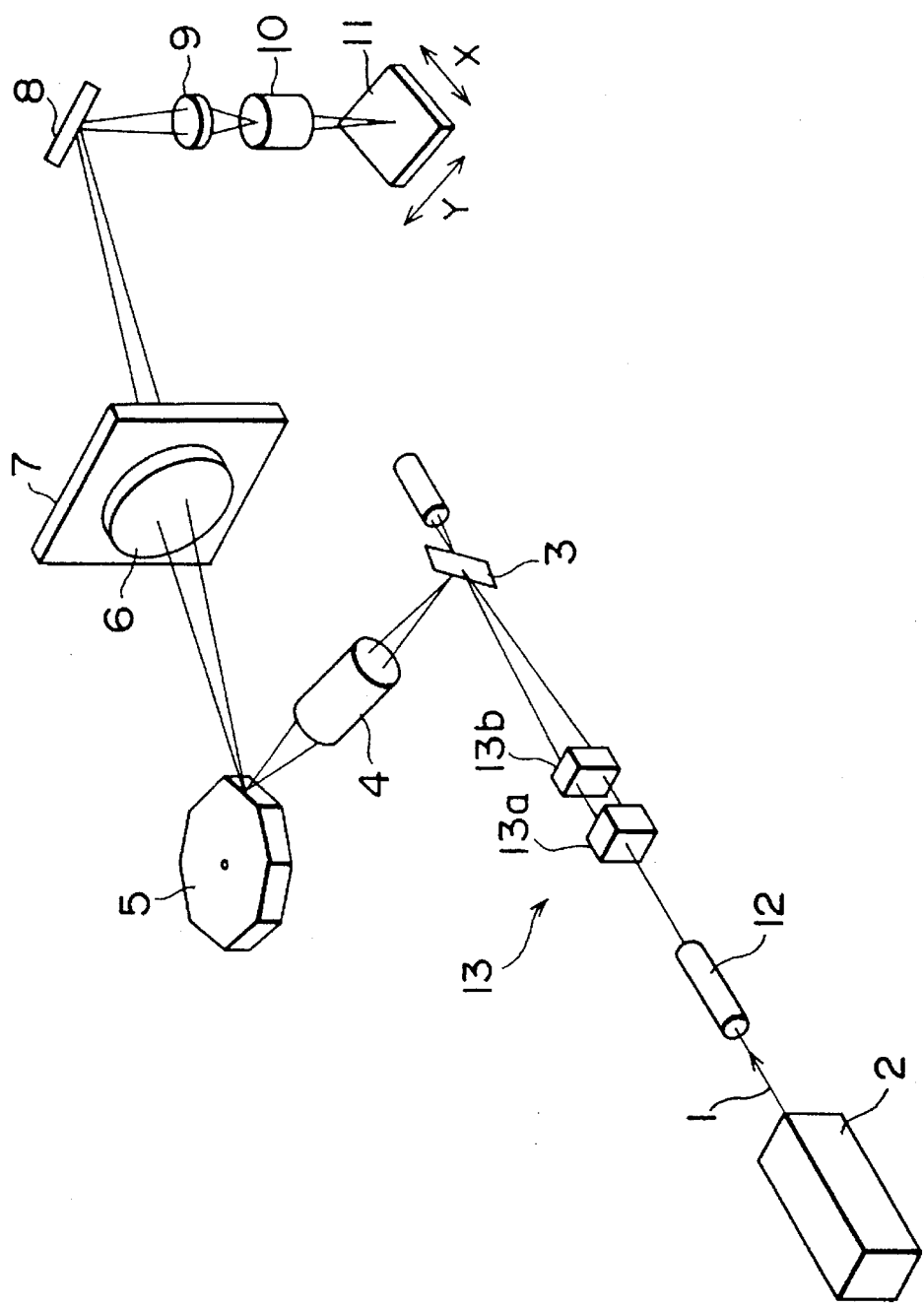
FIG. 1 is an overall configuration diagram of a laser marking apparatus according to a first embodiment of the present invention.

The first embodiment of the present invention is described in detail below, referring to FIGS. 1 to 3. In FIG. 1, reference numeral 1 is a laser beam from a YAG laser oscillator 2 which is a laser beam source, and this laser beam 1 is irradiated onto a marking surface 11 through an X-direction polarizing mirror 3, a relay lens 4, a polygon mirror 5, a field lens 6, a mask 7, a Y-direction polarizing mirror 8, an objective lens 9, and a relay lens 10. In this case, a liquid crystal mask, metal mask or glass mask is used as the mask 7.

In this case, the reflection light of the laser beam 1 is polarized in sequence by a specified angle in the X-direction on the marking surface 11 by the scanning of the X-direction polarizing mirror 3. The reflection light of the X-direction polarizing mirror 3 is irradiated onto a polygon mirror 5 through a relay lens 4, and the Y-direction scanning is carried out for one line on the marking surface 11 in the Y direction in accordance with the rotation of this polygon mirror 5. The reflection light of the polygon mirror 5 is condensed to a desired size through the field lens 6 and marked on the marking surface 11 according to the preset pattern of the mask 7 and the polygon mirror 5.

In this embodiment with the above configuration, a beam expander 12 and a double polarizing prism 13 are provided, in that order from the upstream side, between the YAG laser oscillator 2 and the X-direction polarizing mirror 3.

The double polarizing prism 13 is an element for separating the incident laser beam 1 into two linear polarized beams whose polarized planes intersect each other orthogonally, and Rochon type prisms are used in this embodiment. In this case, the double polarizing prism 13 comprises a pair of an upstream polarizing prism 13a and a downstream polarizing prism 13b which are arranged in series. Each Rochon prism is made by joining polarizing prisms whose crystal axes (Z axes) orthogonally intersect each other, and the upstream polarizing prism 13a and the downstream polarizing prism 13b are arranged on the axial line of the laser beam 1. These polarizing prisms 13a and 13b are arranged with a distance d therebetween as shown in FIG. 2A, the incident laser beam 1 from the YAG laser oscillator 2 is divided into an ordinary ray laser beam 1a and an extraordinary ray laser beam 1b by the upstream polarizing prism 13a and these beams are introduced into the downstream polarizing prism 13b. The ordinary ray laser beam 1a stays on the same line as the incident laser beam 1 and this alignment is maintained even through the downstream polarizing prism 13b. On the other hand, the extraordinary ray laser beam 1b is polarized by the upstream polarizing prism 13a, polarized in an opposite direction by the downstream polarizing prism 13b, and introduced onto the X-direction polarizing mirror 3.

The following describes adjusting means for adjusting the position of the double polarizing prism 13, referring to FIG. 3. The upstream polarizing prism 13a is fitted to the rotary holder 14. One end of the rotary holder 14 has a geared surface 15 on its external periphery, and this geared surface 15 engages with the gear 16a of a geared motor 16, which is installed on a fixing frame. The rotary holder 14 is rotated by the geared motor 16 to rotate the upstream polarizing prism 13a. The downstream polarizing prism 13b is accommodated in a slide holder 17, which slides and engages with the rotary holder 14. An arm 18 is provided on the external surface of the slide holder 17, a nut part 19 is provided at the extreme end of the arm 18, and a screw shaft 20 is inserted into the nut part 19 in threaded engagement therewith. The screw shaft 20 is rotatively driven by a drive motor 21. The slide holder 17 is moved by this rotation along the direction of the incident laser beam 1 so as to adjust the distance d between the upstream polarizing prism 13a and the downstream polarizing prism 13b. The double polarizing prism 13 is disposed so that the twin laser beams 1a and 1b are separated in the X direction on the marking surface 11. A Q switch is provided in the YAG laser oscillator 2 to allow oscillation of a pulse laser with a high peak power.

In the above-described configuration, the laser beam 1, which has passed through the beam expander 12, is divided by the upstream polarizing prism 13a and the downstream polarizing prism 13b into the linear polarized twin laser beams 1a and 1b, which orthogonally intersect each other. These twin laser beams 1a and 1b are introduced onto the X-direction polarizing mirror 3, whereby the laser beams 1a and 1b are polarized in a direction where the laser beams are suited to an angle of attack. Subsequently, the beam, which is spreading over this angle of attack, is condensed onto one point of the polygon mirror 5 through the relay lens 4. Scanning is carried out by the polygon mirror 5, and a part of the mask 7 which contains image information is raster-scanned. At this time, this image information is condensed into a required size by the field lens 6 and irradiated to be branched in the X direction on the marking surface 11 through the Y-direction polarizing mirror 8, the objective lens 9, and the relay lens 10.

Consequently, an angle $\Theta$ from the horizontal axial lines of the twin laser beams 1a and 1b, as viewed from the Z direction, can be determined according to the rotation angle $\Theta$, as shown in FIG. 2B, by driving the geared motor 16 to rotate the upstream polarizing prism 13a. Since the distance 1 between the twin laser beams 1a and 1b is determined according to the distance d between the upstream polarizing prism 13a and the downstream polarizing prism 13b, this distance can be adjusted by the drive motor 21 rotating the screw shaft 20 to move the slide holder 17. Such adjustments of the angle $\theta$ and the distance 1 change the distance D when the twin laser beams 1a and 1b are irradiated onto the mask 7, and therefore the marking accuracy on the marking surface 11 can be adjusted to an optimum value.

Specifically, a square area is raster-scanned in marking, and FIG. 2C shows a case wherein four scanning lines are required when the beam diameter is $S_1$ and the distance between the beam centers is $D_1$. In this case, although the beam diameter increases to S when the laser power is raised, not only are the beam spots overlapped, as shown in FIG. 2D, and the laser power cannot be effectively used, but also the number of scanning lines cannot be reduced if the distance $D_1$ between the beam centers remains unchanged. On the contrary, in the case of this embodiment, the distance between the beam centers is increased from $D_1$ to D to prevent overlapping of the beam spots. Consequently, the number of scanning lines can be reduced from four to two, and the marking speed can be doubled.

A second embodiment of the present invention is described according to FIGS. 4 to 5C. The components which are the same as in the first embodiment are given the same reference numerals as in the first embodiment, and the description is omitted.

An adjusting means for adjusting the rotation angle of the double polarizing prism 13 is described referring to FIG. 4. The upstream polarizing prism 13a and the downstream polarizing prism 13b are fixed in one rotary holder 22, which is rotatably held by the bearing 23. A stepping motor 24 is disposed away from the rotary holder 22, and a timing belt 25 is engaged on the pulleys, which are respectively installed on the stepping motor 24 and the rotary holder 22, to rotate the rotary holder 22. Then the upstream polarizing prism 13a and the downstream polarizing prism 13b are simultaneously rotated with the distance d therebetween kept fixed. The distance D, where the twin laser beams 1a and 1b irradiate the mask 7, is the maximum value as shown in FIG. 5A and in FIG. 5B, showing the Z view. When the rotary holder 22 is rotated as in this embodiment, the distance D can be changed and adjusted to a distance $D_\Theta = D\cos\Theta$ in accordance with the rotation angle $\Theta$, as shown in FIG. 5C. Even when the upstream polarizing prism 13a and the downstream polarizing prism 13b are adapted to be independently rotated with the distance d therebetween kept fixed, this distance D can be similarly adjusted.

In addition, FIG. 6 shows an example in which a pair of Wollaston prisms is used as the double polarizing prism 26. A Wollaston prism is such that the incident direction of the Rochon prism is changed by 90 degrees, and a similar function to the Rochon prism can be obtained. In other words, the double polarizing prism 26 comprises a pair of an upstream polarizing prism 26a and a downstream polarizing prism 26b, which have the distance d therebetween and which are arranged on the axial line of the incident laser beam 1. Thus, the incident laser beam 1 is divided into the twin laser beams 1a and 1b at the upstream polarizing prism 26a and these are introduced into the downstream polarizing prism 26b. At this time, the twin laser beams 1a and 1b are polarized in opposite directions and are introduced onto the X-direction polarizing mirror 3. The distance D, between where the twin laser beams 1a and 1b irradiate the mask 7, is adjusted as described above by rotating the rotary apparatus shown in FIG. 4 on which the polarizing prisms 26a and 26b are mounted for rotational scanning.

Industrial Applicability of the Invention

The laser marking apparatus according to the present invention is capable of carrying out marking on a material with a low marking threshold at more than twice the scanning speed, by using a high output laser marking apparatus, and also effectively uses the laser power and ensures high marking accuracy.

What is claimed is:

1. In a laser marking apparatus for passing a laser beam along a beam path from a laser beam source through a raster-scanning system onto a marking surface, said raster-scanning system comprising:

an X-direction polarizing mirror, a Y-direction polarizing mirror, a field lens, and a mask, wherein said X-direction polarizing mirror, said Y-direction polarizing mirror, said field lens, and said mask are arranged along said beam path so that said laser beam is reflected by each of said X-direction polarizing mirror and said Y-direction polarizing mirror and passes through each of said field lens and said mask, wherein one of said X-direction polarizing mirror and said Y-direction polarizing mirror is upstream of the other one of said X-direction polarizing mirror and said Y-direction polarizing mirror, with respect to passage of said laser beam along said beam path;

the improvement comprising:

a double polarizing element for branching said laser beam from said laser beam source into two branch beams, said double polarizing element comprising two polarizing prisms arranged in series, with respect to passage of said laser beam along said beam path, at a position in said beam path between said laser beam source and the upstream one of said X-direction polarizing mirror and said Y-direction polarizing mirror, said two polarizing prisms being spaced apart from each other so that there is a distance between the two polarizing prisms along said beam path; and an adjusting means for varying said distance between the two polarizing prisms.

2. A laser marking apparatus in accordance with claim 1, wherein a portion of said beam path which is incident to said double polarizing element has an axis, and wherein said two polarizing prisms are arranged on said axis of said portion of said beam path which is incident to said double polarizing element.

3. A laser marking apparatus in accordance with claim 2, wherein each of said two polarizing prisms comprises a Rochon prism.

4. A laser marking apparatus in accordance with claim 2, wherein each of said two polarizing prisms comprises a Wollaston prism.

5. A laser marking apparatus in accordance with claim 1, wherein said adjusting means comprises:

a first holder holding one of said two polarizing prisms, a second holder holding the other of said two polarizing prisms, and means for causing said second holder to move along said beam path, thereby varying said distance between the two polarizing prisms.

6. A laser marking apparatus in accordance with claim 5, wherein said second holder has a threaded opening therein; and wherein said means for causing comprises a screw shaft in threaded engagement with said threaded opening, and a motor for rotating said screw shaft, whereby the rotation of said screw shaft causes said second holder to slide along said beam path to vary said distance between the two polarizing prisms.

7. A laser marking apparatus in accordance with claim 5, further comprising means for rotating said first holder about said beam path.

8. A laser marking apparatus in accordance with claim 7, wherein said first holder is provided with a geared surface on its external periphery, and wherein said means for rotating said first holder comprises a gear in engagement with said geared surface, and a motor for driving said gear.

9. A laser marking apparatus in accordance with claim 8, wherein said second holder has a threaded opening therein; and wherein said means for causing comprises a screw shaft in threaded engagement with said threaded opening, and a motor for rotating said screw shaft, whereby the rotation of said screw shaft causes said second holder to slide along said beam path to vary said distance between the two polarizing prisms.

10. A laser marking apparatus in accordance with claim 9, further comprising a polygon mirror positioned in said beam path between said field lens and said upstream one of said X-direction polarizing mirror and said Y-direction polarizing mirror, said mask being positioned between said field lens and the downstream one of said X-direction polarizing mirror and said Y-direction polarizing mirror.

11. In a laser marking apparatus for passing a laser beam along a beam path from a laser beam source through a raster-scanning system onto a marking surface, said raster-scanning system comprising:

an X-direction polarizing mirror, a Y-direction polarizing mirror, a field lens, and a mask, wherein said X-direction polarizing mirror, said Y-direction polarizing mirror, said field lens, and said mask are arranged along said beam path so that said laser beam is reflected by each of said X-direction polarizing mirror and said Y-direction polarizing mirror and passes through each of said field lens and said mask, wherein one of said X-direction polarizing mirror and said Y-direction polarizing mirror is upstream of the other one of said X-direction polarizing mirror and said Y-direction polarizing mirror, with respect to passage of said laser beam along said beam path;

the improvement comprising:

a double polarizing element for branching said laser beam from said laser beam source into two branch beams, said double polarizing element comprising two polarizing prisms arranged in series, with respect to passage of said laser beam along said beam path, at a position in said beam path between said laser beam source and the upstream one of said X-direction polarizing mirror and said Y-direction polarizing mirror, said two polarizing prisms being spaced apart from each other so that there is a distance between the two polarizing prisms along said beam path; and an adjusting means for adjusting a rotation angle of at least one of said polarizing prisms.

12. A laser marking apparatus in accordance with claim 11, wherein a portion of said beam path which is incident to said double polarizing element has an axis, and wherein said two polarizing prisms are arranged on said axis of said portion of said beam path which is incident to said double polarizing element.

13. A laser marking apparatus in accordance with claim 12, wherein each of said two polarizing prisms comprises a Rochon prism.

14. A laser marking apparatus in accordance with claim 12, wherein each of said two polarizing prisms comprises a Wollaston prism.

15. A laser marking apparatus in accordance with claim 11, further comprising an adjusting means for varying said distance between the two polarizing prisms.

16. A laser marking apparatus in accordance with claim 11, wherein the distance between the two polarizing prisms along said beam path is fixed.

17. A laser marking apparatus in accordance with claim 11, wherein said adjusting means adjusts a rotation angle at which said two polarizing prisms are simultaneously rotated.

18. A laser marking apparatus in accordance with claim 17, wherein said adjusting means comprises a rotary holder which accommodates said two polarizing prisms, a bearing which rotatably holds said rotary holder, and means for rotating said rotary holder.

19. A laser marking apparatus in accordance with claim 18, wherein said means for rotating said rotary holder comprises a pulley mounted on the external periphery of said rotary holder, a drive motor, and a drive belt engaging said pulley and driven by said drive motor, whereby rotation of said drive motor adjusts the rotation angle of said two polarizing prisms.

20. A laser marking apparatus in accordance with claim 19, wherein said drive motor is a stepping motor, and wherein said drive belt is a timing belt.

21. A laser marking apparatus in accordance with claim 20, wherein the distance between the two polarizing prisms along said beam path is fixed.

22. In a method of laser marking a surface of an object, said method comprising the steps of:

producing a laser beam having enough laser power for marking on a material;

providing a mask having a patterned portion thereof which passes said laser beam;

raster-scanning said mask with the thus produced laser beam;

directing onto said surface the laser beam which has been passed through said mask so as to mark on said surface of said object the shape of the patterned portion of the mask through which the laser beam is passed;

the improvement comprising:

passing the thus produced laser beam through a double polarizing element for branching said thus produced laser beam into two branch beams, utilizing said two branch beams to raster-scan said mask, directing onto said surface of said object the two branch beams which have been passed through said mask to form a beam spot on said surface of said object, and adjusting a distance between the two branch beams on a surface of said mask.

23. A method in accordance with claim 22, wherein said laser beam has enough power for marking on a material having a high marking threshold, wherein said surface of said object has a low marking threshold which is substantially lower than said high marking threshold, and wherein said beam spot on said surface of said object has a diameter, a central part, and a periphery; and further comprising:

increasing said diameter of said beam spot on said surface of said object while maintaining a uniform intensity distribution from said central part of said beam spot to said periphery of said beam spot.

24. In a method of laser marking a surface of an object, said method comprising the steps of:

producing a laser beam having enough laser power for marking on a material:

providing a mask having a patterned portion thereof which passes said laser beam;

raster-scanning said mask with the thus produced laser beam;

directing onto said surface the laser beam which has been passes through said mask so as to mark on said surface of said object the shape of the patterned portion of the mask through which the laser beam is passed;

the improvement comprising:

passing the thus produced laser beam through a double polarizing element for branching said thus produced laser beam into two branch beams;

utilizing said two branch beams to raster-scan said mask, directing onto said surface of said object the two branch beams which has been passed through said mask to form a beam spot on said surface of said object, and varying an angle of rotation of one of said branch beams around the other of said branch beams.

25. A method in accordance with claim 24, wherein said laser beam has enough power for marking on a material having a high marking threshold, wherein said surface of said object has a low marking threshold which is substantially lower than said high marking threshold, and wherein said beam spot on said surface of said object has a diameter, a central part, and a periphery; and further comprising:

increasing said diameter of said beam spot on said surface of said object while maintaining a uniform intensity distribution from said central part of said beam spot to said periphery of said beam spot.

* * * * *